(12) United States Patent  
Demiryont

(10) Patent No.: US 7,265,890 B1
(45) Date of Patent: Sep. 4, 2007

(54) ELECTROCHROMIC INFRARED TUNABLE FILTER AND EMISSIVITY MODULATOR

(75) Inventor: Hulya Demiryont, Indian Rocks Beach, FL (US)

(73) Assignee: Eclipse Energy Systems, Saint Petersburg, FL (US)

( * ) Notice: Subject to any disclaimer, the term of this patent is extended or adjusted under 35 U.S.C. 154(b) by 0 days.

(21) Appl. No.: 11/465,485

(22) Filed: Aug. 18, 2006

Related U.S. Application Data

(63) Continuation-in-part of application No. 11/425,379, filed on Jun. 20, 2006.

(51) Int. Cl.
*G02F 1/153* (2006.01)

(52) U.S. Cl. .................. 359/269; 359/267; 359/265; 359/271; 359/273; 359/275

(58) Field of Classification Search .............. 359/265; 252/62.2
See application file for complete search history.

(56) References Cited

U.S. PATENT DOCUMENTS

| | | | | |
|---|---|---|---|---|
| 4,465,339 A | * | 8/1984 | Baucke et al. | 359/274 |
| 5,638,205 A | * | 6/1997 | Meisel et al. | 359/350 |
| 5,744,227 A | * | 4/1998 | Bright et al. | 428/216 |
| 5,757,537 A | * | 5/1998 | Ellis et al. | 359/268 |
| 5,935,723 A | * | 8/1999 | Borden | 428/698 |
| 6,094,292 A | * | 7/2000 | Goldner et al. | 359/265 |
| 6,327,069 B1 | * | 12/2001 | Allemand et al. | 359/265 |
| 6,614,578 B2 | * | 9/2003 | Giri et al. | 359/265 |
| 6,693,318 B1 | * | 2/2004 | Hintermaier | 257/306 |
| 6,876,479 B1 | * | 4/2005 | Giri et al. | 359/273 |
| 7,024,768 B2 | * | 4/2006 | Giri et al. | 29/890.1 |
| 7,075,697 B2 | * | 7/2006 | Giri et al. | 359/273 |
| 7,099,062 B2 | * | 8/2006 | Azens et al. | 359/265 |
| 2004/0089540 A1 | * | 5/2004 | Van Heuveln et al. | 204/293 |
| 2005/0200937 A1 | * | 9/2005 | Weidner | 359/275 |
| 2006/0028730 A1 | * | 2/2006 | V. Varaprasad et al. | 359/604 |
| 2006/0209383 A1 | * | 9/2006 | Burdis et al. | 359/265 |

OTHER PUBLICATIONS

Demiryont et al., American Inst. of Physics Conference Proceedings CP#813, pp. 64-73, Jan. 20, 2006.

* cited by examiner

*Primary Examiner*—Ricky Mack
*Assistant Examiner*—Michael P Roberts
(74) *Attorney, Agent, or Firm*—David Kiewit

(57) ABSTRACT

An electrochromic device is usable for tuning and modulating infrared radiation in a spectral region comprising wavelengths between approximately 1 and 30 microns. This device comprises a plurality of thin films successively deposited on a substrate. The first of these films is a substrate electrode deposited on a suitably prepared substrate. A plurality of active layers comprising at least an electrochromic layer, an electrolyte layer and an ion storage layer and a substantially transparent metal layer are then preferably deposited on the substrate electrode. The preferred active layers are characterized by a transmittance that is selectively controllable by applying a voltage across the plurality of active layers.

7 Claims, 3 Drawing Sheets

ELECTROCHROMIC INFRARED TUNABLE FILTER AND EMISSIVITY MODULATOR

CROSS REFERENCE TO RELATED APPLICATIONS

This application is a continuation-in-part of the inventor's U.S. Ser. No. 11/425,379, entitled "Electrochromic Device with Self-forming Ion Transfer Layer and Lithium Fluoro-Nitride Electrolyte," which was filed on Jun. 20, 2006.

BACKGROUND OF THE INVENTION

1. Field of the Invention

The invention relates to multi-layer thin film structures and fabrication techniques for forming electrical devices, and in particular, for forming electrochromic devices for modulating visible, and, more significantly, tuning and modulating infrared radiation.

2. Background Information

An electrochromic device ('ECD') is used to modulate light and commonly comprises two active layers separated by an electrolyte (sometimes referred to as an 'EL' or 'EL layer') through which a selected mobile ion can be controllably moved from one of the active layers to the other. Both of the active layers can contain varying concentrations of the mobile ion. In at least one of the active layers, commonly referred to as the 'electrochromic layer' ('EC layer'), changes in the ion concentration are accompanied by changes in both the amount of light absorbed and the spectral variation of that absorption—i.e., changes in color and transparency. In the other active layer, commonly referred to as the 'ion storage layer' (IS layer), changing the ion concentration may or may not be accompanied by notable changes in transparency or coloration. If the IS does not show a visible change, it is referred to as a 'passive ion storage layer.' If the applied voltage causes an optical change in the IS layer similar to the one occurring in the EC layer, it is called a 'complementary ion storage layer.'

Operation of an electrochromic device generally involves applying a voltage between the electrochromic and ion storage layers so as to cause the mobile ions to move from one layer to the other and to thereby selectively alter the coloration and transparency of the EC layer. This is commonly described in terms of the EC layer, or of the entire ECD, being switched between 'bleached' and 'colored' states. Longstanding concerns of ECD development include finding film systems in which the transition between the two states is relatively speedy, can be accomplished with relatively low voltages, and provides a large change in transparency between the bleached and colored states. Another performance concern is optimizing the 'self bleaching time' of coloration decay after removal of the voltage.

In addition to the EC, EL, and IS layers, there are two electrode layers in an ECD, one abutting the EC layer and the other abutting the IS layer. The electronic conductivity of these layers is often an important consideration and can impose limitations on the switching speed and the uniformity of coloration.

Additional layers may be required in various ECD embodiments in order to protect the ECD during fabrication and service, or to prevent internal degradation. The most common additional external layer is an overcoat serving as an ambient moisture barrier. The overcoat layer is comprised of a transparent material, such as an oxide or a polymer material, which may be applied subsequent to vacuum processing by dipping, spraying, spinning, screening, or any other suitable approach.

Although the term 'infrared' generally encompasses electromagnetic radiation extending from the long wavelength limit of visible radiation (e.g., about 780 nm) to the low wavelength boundary of the microwave region (e.g., about 1 mm), the principle areas of interest to the present invention are the 'near IR,' 'mid IR,' and 'long-wave IR' regions that, taken together, extend from about 780 nm to about 50 microns. One reason for interest in this spectral region is that it encompasses substantially all the energy radiated by a black body at 300 degrees Kelvin, which is the optimal internal temperature of a space satellite. Because the external surfaces of a space satellite are exposed to the extreme temperatures of space, regulating the internal satellite temperature through surface emissivity control is an area of interest.

BRIEF SUMMARY OF THE INVENTION

A preferred embodiment of the invention provides an electrochromic device for use in a spectral region comprising wavelengths between 1 and 30 microns. This device comprises a plurality of thin films successively deposited on a substrate. The first of these films is a substrate electrode deposited on a suitably prepared substrate. A plurality of active layers comprising at least an electrochromic layer, an electrolyte layer, an ion storage portion, and a substantially transparent metal layer are then preferably deposited on the substrate electrode. The preferred active layers are characterized by a transmittance that is selectively controllable by applying a voltage across the plurality of active layers. Such voltage is preferably a direct current (DC) voltage, but may also be a pulsed voltage, voltage of a given waveform, voltage of a dithered wave form, or any other type of voltage.

In preferred embodiments, the transparent metal electrode is formed from a thin film of metal, which is preferably silver but may also comprise gold, copper, aluminum, or other metals and alloys having high electrical conductivity, and is overlaid with an IR transparent overcoat on an exterior surface thereof. The overcoat preferably comprises silicon, but may also be formed of germanium, zinc sulfide, or other similar materials.

Although some embodiments of the invention employ a single IS layer as the ion storage portion, the invention comprehends at least three basic structural embodiments of the ion storage portion involving at least one active ion storage layer and, in some cases, a separate diffusion barrier layer. These three embodiments of the ion storage portion are hereinafter referred to as: dual layer, mixed layer, and single layer. The composition of the diffusion barrier layer, where employed, is dependant upon the metal layer selected, as the function of the diffusion barrier layer is to prevent diffusion of the metal into the ion storage layer. Materials known to act as metal diffusion barriers include without limitation TCOs and some oxides known to be usable in an ECD, hereinafter referred to as active oxides. In the following descriptions, it is assumed silver was selected as the metal layer. Materials that act as a diffusion barrier to silver preferably include ITO and $PrO_x$, where the parameter x is generally in the range of 1.5 to 2.0.

A dual layer ion storage portion configuration comprises two separate layered active ion storage materials, where the active IS layer material abutting the transparent metal electrode also performs a diffusion barrier function. IS materials for the dual layer configuration preferably comprise at least two of: vanadium pentoxide, praseodymium oxide, tin dioxide, or other metal oxides. If vanadium pentoxide is employed, it is separated from the transparent metal electrode by another IS oxide layer, which may be praseodymium oxide. A dual component IS layer of this configuration does not require a separate diffusion barrier layer.

The mixed layer configuration comprises at least two co-deposited oxides, which may comprise at least two of: vanadium pentoxide, praseodymium oxide, tin dioxide, or other metal oxides. Depending on the specific oxides employed, an additional diffusion barrier may or may not be required. For example, in experiments in which one of the components of the mixed IS layer was vanadium pentoxide, an additional diffusion barrier was used. This diffusion barrier was formed from a transparent conductive oxide, such as indium-tin-oxide (ITO); however, active oxides, such as $PrO_x$ may also be used.

A single component IS configuration may comprise vanadium pentoxide used with a separate diffusion barrier layer. The diffusion barrier for a single component IS portion configuration is also formed from a transparent conductive oxide, such as indium-tin-oxide (ITO).

Another aspect of the invention is that it provides a thin film electrochromic device formable on a substrate and comprising a substrate electrode deposited on the substrate. An electrochromic layer is then formed directly on the substrate electrode, preferably by first depositing tungsten oxide and then depositing lithium in the presence of ionized nitrogen to simultaneously load the tungsten oxide and to form an ion transfer layer. An ion storage layer, which may comprise an oxide of vanadium, is also provided and is separated from the electrochromic layer by an electrolyte layer. In a particular preferred embodiment the electrolyte comprises lithium, fluorine and nitrogen and is deposited onto an ion transfer layer from a lithium fluoride source in the presence of ionized nitrogen. In a particular preferred embodiment a diffusion barrier layer, which may comprise a conventional, non-ion-storing transparent conductive oxide (TCO), such as ITO, or which may comprise an oxide of praseodymium, is deposited on the ion storage layer and separates the ion storage layer from a thin transparent electrode layer which may comprise silver.

One aspect of the invention is that it provides an electrochromic device prepared by forming multiple layers of selected materials on a substrate in a vacuum processing chamber. A first of these layers may be an electrode layer deposited directly on the substrate and used for making contact to a subsequently deposited precursor film from which an electrochromic is formed. This precursor film may comprise a metal oxide and is preferably tungsten oxide. In a subsequent step in a preferred process a mobile ion forming species, which is preferably lithium, is deposited in the presence of ionized nitrogen. This forms the active electrochromic layer, due to diffusion of the lithium into the tungsten oxide. At the same time, it forms a thin lithium nitride ion transfer layer on the then exposed surface. Subsequently, an electrolyte layer, preferably comprising lithium, fluorine and nitrogen, is formed directly on the ion transfer layer and an ion storage layer is deposited directly on the electrolyte layer. A diffusion barrier layer may then be deposited directly on the ion storage layer. A thin, transparent metal electrode layer, which is preferably a silver film, and an IR transparent protective overcoat, which preferably comprises silicon, are then deposited on the diffusion barrier.

Another aspect of the invention is that it provides an electrochromic device operable as a tunable filter for infrared radiation. A device of this sort exhibits a series of absorption peaks at wavelengths of interest. When a 'coloring' voltage is applied to such a device, the characteristic absorption wavelengths display a red shift with time—e.g., over a period of one to thirty minutes. In devices using a lithiated tungsten oxide EC layer, the overall coloring response to an electric field is associated with diffusion of lithium from the IS layer into the EC layer. The shift of characteristic wavelength, however, appears to be associated with some other mechanism, which may involve changes in the molecular vibration absorption bands arising from reduction of the intercalating medium and oxidization of the ion extracting medium. These tunable absorption peaks, extending from 1.3 to 10 microns, were observed for the first time in an ECD of this invention and result from the unique design of an ECD of this invention.

A preferred process of making an ECD of the invention requires that a vacuum processing chamber be pumped down only twice. The first evacuation is used to deposit a first electrode that will subsequently contact the EC layer. During the second evacuation all the other thin film portions of the ECD—e.g., the EC, ion transfer, EL, IS, diffusion barrier and transparent electrode layers—are formed. It is thus one of the objects of the invention to provide an ECD fabrication process that is faster than those used in the other areas of art and that requires fewer vacuum processing cycles. This invention provides an emissivity modulation at approximately room temperature substantially better than prior art mechanical louver assembly currently used in spacecraft thermal control.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWINGS

FIG. 1-*b* is a schematic cross-sectional view depicting a dual-layer configuration of an ion storage portion of an ECD of the invention.

FIG. 1-*c* is a schematic cross-sectional view depicting a mixed layer configuration of an ion storage portion of an ECD of the invention.

FIG. 1-*d* is a schematic cross-sectional view depicting a single-layer configuration of an ion storage portion of an ECD of the invention.

DETAILED DESCRIPTION OF THE INVENTION

Figure 1:
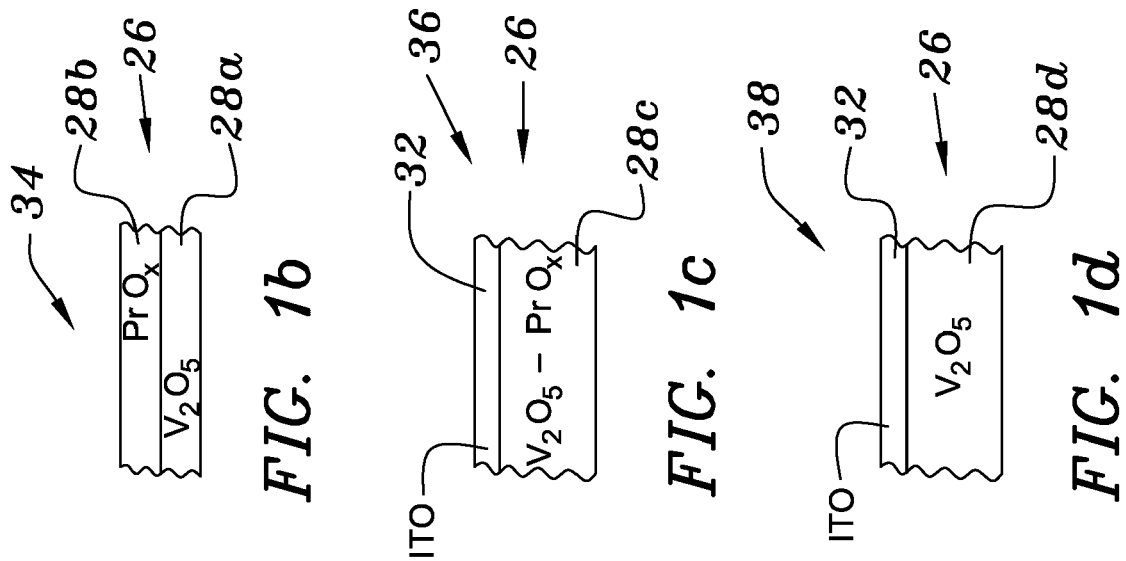
FIG. 1-*a* is a schematic cross-sectional view depicting an ECD of the invention.

As depicted in the schematic cross sectional view of FIG. 1-a, an ECD 10 of the invention may be configured to modulate radiation 12 reflected from a mirror-like substrate electrode 14. When the ECD active layers 16 are transparent, external radiation 12 is reflected from a mirror electrode, as depicted in FIG. 1a. When at least one of the active layers is absorbing, however, the radiation is absorbed, rather than being reflected. A configuration of this sort may be used, for example, in a tunable filter for near and mid-IR regions (e.g., 0.78 to 5 microns) and in a space-craft thermal management system in the long wave IR region. It will be recognized that one could also make a transmissive mode ECD device of the sort that is commonly used in applications in the visible region and near infrared regions of the spectrum. Such a device would, of course, require both a transparent substrate and a transparent substrate electrode. A transmissive configuration of the invention might be used, for example, as an IR modulating ECD.

One part of preparing the reflective mode device comprises depositing a mirror-like electrode on a suitable substrate 18, which may be either a rigid or a flexible material. This substrate electrode 14 may be a film of a metal that is compatible with an ECD and that does not diffuse into any of the adjacent active layers, or may be multi-layer electrode. Alternately, the substrate electrode 14 may be a conductive metal oxide layer (e.g., ITO) that is conductive enough to be highly reflective in the infrared spectral region of interest.

As is known in the ECD arts, after the substrate electrode layer is deposited, a pattern of metallic bus bars (not shown) may be provided on the electrode surface. Various approaches are possible for providing these metallic bus bar contacts to the EC electrode, and these do not necessarily differ between the preferred embodiment of the present invention and the prior art of fabricating ECDs for use in the visible region of the electromagnetic spectrum. Moreover, it is known in the ECD arts to sometimes provide a matching layer between a substrate 18 and a substrate electrode. Thus, although the substrate electrode may sometimes be described herein as being deposited on the substrate, it should be recognized that this description encompasses cases in which at least one other layer exists between the substrate and the substrate electrode. For emissivity modulation in spacecraft applications, substrates of this invention preferably comprise space-compatible material including, without limitation, polymers. For tunable filter applications, substrates of this invention preferably comprise rigid substrates, such as glass.

Although ITO is the preferred substrate electrode for a reflective ECD of the invention, it should be recognized that many other electrochemically inert electronic conductors can be used. Such materials include, but are not limited to species such as ZAO (Al-doped ZnO); mixtures of $SnO_2$ and ZnO; fluorine doped tin or zinc oxides; as well as a multi-layer arrangement described in Applicant's U.S. patent application Ser. No. 11/278,643, filed on Apr. 4, 2006, the disclosure of which is herein incorporated by reference. Some of these materials, because of their transparency in the visible portion of the spectrum, are often referred to as 'transparent conducting oxides' (TCO). The reader should recognize that although these materials may be referred to herein as TCOs or the like, many of them are highly reflecting in at least some portions of the infrared wavelength region from approximately 1 to 30 microns and therefore may not be transparent at all wavelengths of interest.

In the preferred embodiment of the present invention an EC precursor layer is vacuum deposited on the substrate electrode and then loaded with the mobile ion of choice to form the EC layer 20. This EC precursor may comprise a metal oxide film. In the examples discussed hereinafter, this is a tungsten oxide film that is between 20 and 1000 nm thick, is preferably 200 to 700 nm thick, and is more preferably between 300 and 600 nm thick.

Although the preferred EC precursor layer comprises tungsten oxide, other materials known in the ECD art may also be used. Such materials include, but are not limited to, oxides of molybdenum, titanium, tantalum, and niobium; tungsten oxide doped with silver or gold; and organic electrochromic materials. Moreover, ternary metal oxides, such as a molybdenum—tungsten oxide, can also be used to form EC layers 20.

Although the preferred mobile ion is lithium, it should be recognized that other species known in the ECD art may be used. These comprise, but are not limited to, hydrogen, potassium, sodium, and silver. Use of a mobile species other than lithium may lead to the use of an EC-forming process step that differs from that used in the preferred process described herein.

In the preferred process of the invention, the EC layer is formed from the EC precursor by depositing lithium in the presence of ionized nitrogen. This both loads the EC precursor film to form a lithiated tungsten oxide and simultaneously forms a lithium-nitride ion transfer layer 22. The lithiated tungsten oxide can be represented as $Li_xWO_3$, where the parameter x is generally in the range of 0.1 to 0.35 and preferably in the range of 0.15 to 0.25.

In the foregoing, nitrogen is preferably introduced into a vacuum processing chamber from a piping structure or ring adjacent the substrate and having a plurality of orifices disposed along its length. At least a portion of the gas flowing out of the ring is ionized to enhance a reaction with lithium to form a lithium-nitride ion transfer layer while the lithium is diffusing into the tungsten oxide, a process commonly referred to as "loading." Judging from measured deposition rates, a preferred ion transfer layer is about 2-3 nm thick. The reader will understand that the ring or piping arrangement may have any of a number of shapes; moreover, a variety of apparatus, including, but not limited to End-Hall and Kaufman Gridded ion sources can be used to ionize the nitrogen. Generally speaking, the amount of nitrogen introduced into the vacuum processing chamber is enough so that the partial pressure of nitrogen exceeds the residual partial pressures of oxygen and hydroxide. In a particular preferred process, the introduction of nitrogen raised the pressure in the deposition chamber to about $5 \times 10^{-5}$ Torr from a background level of approximately $1 \times 10^{-6}$ Torr.

In the preferred process the electrolyte layer (EL) 24 is deposited after forming the thin lithium nitride ion transfer layer. In this case a lithium-fluoro-nitride electrolyte layer (EL) is formed by evaporating LiF in the presence of the ionized nitrogen to form a lithium-fluoro-nitride EL. In a preferred embodiment this EL layer is substantially 150 to 500 nm thick and is preferably 250 to 400 nm thick. The preferred EL layer may be represented as $LiF_{1-y}N_y$ where the y parameter is generally in the range of 0.05 to 0.20. It will be recognized that there are many other choices for the electrolyte layer 24, and that those skilled in the ECD arts will recognize that these comprise, but are not limited to LiF, LiAlF$_4$, Li$_3$N, SiO$_x$, CaF$_2$, LiTaO$_3$, LiPO$_2$, Li$_3$PO$_4$, as well as an oxide mixture commonly referred to as LIPON.

In the preferred process an ion storage (IS) portion 26, which may comprise a vanadium oxide layer, is then deposited directly on the EL until an IS film of 80-500 nm, and preferably 150-300 nm, thickness is formed. In some of the preferred processes, the ion storage portion comprises a storage layer 28 separated from a transparent metal electrode 30 by a diffusion barrier layer 32, which is formed of a TCO or active oxide (e.g., PrO$_x$), preferably ITO. As depicted in the cross-sectional views of FIGS. 1-*b*, 1-*c*, and 1-*d*, an IS portion 26 of an ECD 10 of the invention may be configured in at least three different structural variations: dual, mixed, and single. IS storage 28 materials may preferably comprise vanadium pentoxide, praseodymium oxide, tin dioxide, or other metal oxides. The most preferred embodiments comprise Li$_x$V$_2$O$_5$, where the parameter x is less than 0.41 in the bleached condition. Those skilled in the art will recognize that many other materials may be considered for use as an IS storage layer and that these comprise, but are not limited to, binary oxides such as SnO$_2$, CoO, IrO$_2$, MnO, NiO, and PrO$_x$, and ternary oxides such as Ce$_x$V$_y$O$_z$, NiMgO$_x$, and NiAlO$_x$.

FIG. 1-*b* illustrates a dual component configuration 34 of an IS portion 26, which comprises two separately layered ion storage materials 28*a*, 28*b*, where the IS layer 28*b* material abutting the transparent metal electrode also performs as a diffusion barrier. The most preferred dual layer device uses 150 nm each of brown PrO$_x$ and V$_2$O$_5$.

FIG. 1-*c* illustrates a mixed layer configuration 36 of an IS portion 26 of an ECD 10 of the invention, which comprises a mixed layer 28*c* of at least two co-deposited oxides. The most preferred mixed layer device uses 300 nm of PrO$_x$-V$_2$O$_5$. If one of the mixed IS layer materials is V$_2$O$_5$, a 25 to 50 nm diffusion barrier layer 32, preferably comprising ITO, is employed between the mixed IS layer 28*c* and a transparent metal electrode 30.

FIG. 1-*d* illustrates a single component configuration 38 of an IS portion 26 of an ECD 10 of the invention, which preferably comprises a single ion storage layer 28*d* comprising 250 nm of V$_2$O$_5$ which is separated from a transparent metal electrode 30 by a 25 to 50 nm ITO diffusion barrier layer 32.

In either the transmissive or reflective version of an ECD of the invention, the electrode 30 that is distal from the substrate 18 must be transparent. Also, in order for the ECD to function properly this distal electrode 30 must have a sufficiently low electrical resistance. Both of these conditions can be met by using a thin metal film, which may be a silver film having a thickness of at least five and at most several hundred nanometers. This can provide a transparent metal layer having a transmittance of near 90% for all wavelengths between approximately 1 and 30 microns and an electrical resistance of two to five ohms per square. External contacts to the metal layer can be made by conventional methods, such as those described in Applicant's parent application Ser. No. 11/425,379. A final overcoat layer 40, which may be silicon, can then be applied on top of the metal layer at a thickness between 35 and 300 nanometers.

Depositing a silver film directly on a vanadium pentoxide ion storage layer can lead to device failure. The silver quickly diffuses into the vanadium pentoxide, raising the resistance of the electrode and degrading the performance of the ion storage layer. As an example, when 100 nm of V$_2$O$_5$ is coated by 100 nm of silver, the combined film sheet resistance is essentially infinite, while the sheet resistance of the same silver film deposited on glass is 0.5 ohms/square. To overcome this diffusion problem, some embodiments of the invention employ a diffusion barrier layer placed between the ion storage layer and the metal electrode. In one preferred embodiment an ITO film is deposited between a V$_2$O$_5$ ion storage film or mixed ion storage layer and the thin Ag electrode. In another embodiment the ion storage film is formed from a dual layer of V$_2$O$_5$ and PrO$_x$ in which PrO$_x$ also functions as a diffusion barrier between the dual oxide IS layer and the overlying metal layer.

Although the embodiments described above are configured with the EC layer adjacent the substrate and the IS layer distal therefrom, alternate embodiments could be configured with the active layers arranged in the opposite order—i.e., with the IS layer adjacent the substrate and the EC layer distal therefrom. In these latter embodiments the diffusion barrier layer would still be required if the thin transparent top electrode tended to diffuse into the EC layer.

Although the preceding discussion describes a single device comprising a layered structure and provides methods of making such devices, no limitation to a single process resulting in a single device is intended. The reader should understand that a layered structure of the invention can result in a mosaic array of individually controlled devices, as may be used in display and imaging applications. Such a mosaic structure can be formed by a variety of methods comprising at least the use of deposition masks and of selectively removing material from a portion of the layered structure, as is commonly done with photolithography. Moreover, it should be recognized that in some cases, such as an emissivity control system covering a large fraction of the surface of a spacecraft, a plurality of individual devices may be operated as though they were a single device.

The films described herein are preferably deposited by electron beam evaporation. The reader will understand, however, that many other physical or chemical vapor deposition methods, including vapor deposition from a resistively heated crucible, sputtering, etc., could also be employed in practicing the invention. In addition, various liquid precursor and sol-gel deposition methods may be used. Moreover, as is known in the art of ECD fabrication, the evaporation rates and substrate surface temperatures are controlled so that the deposition and diffusion rates of the mobile ion (e.g., lithium) are comparable.

Figure 2:
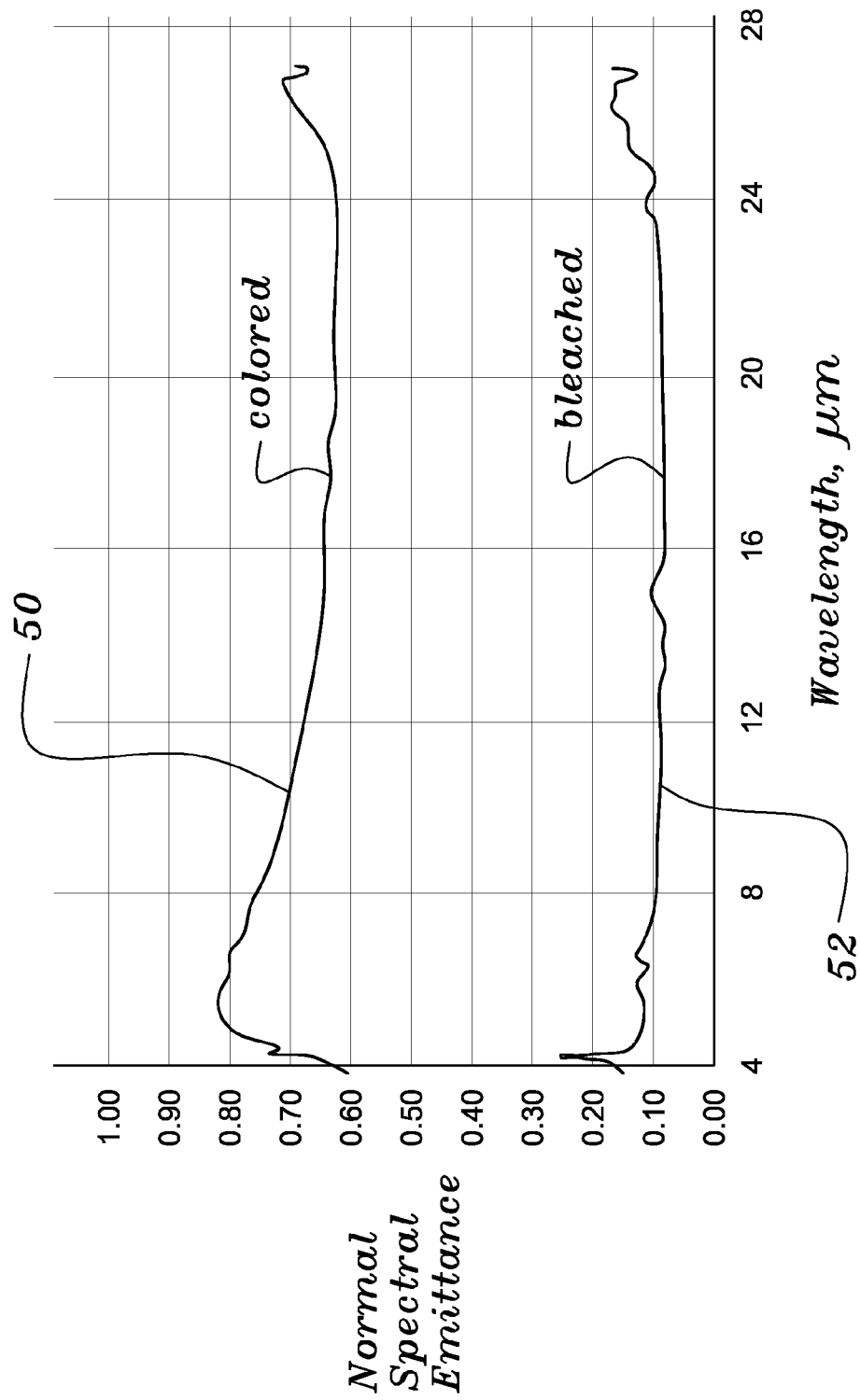
FIG. 2 depicts the normal spectral emittance at room temperature of an ECD of the invention.

As discussed above, films of the invention are usable for a temperature control system that relies on radiative heating and cooling. This utility arises because one can selectively control the emittance of the films in the 7 to 13 micron-infrared spectral region. The two spectral emittance curves (derived from reflectance measurements) 50, 52 depicted in FIG. 2 for the colored 50 and bleached 52 states of a single film show this effect.

Figure 3:
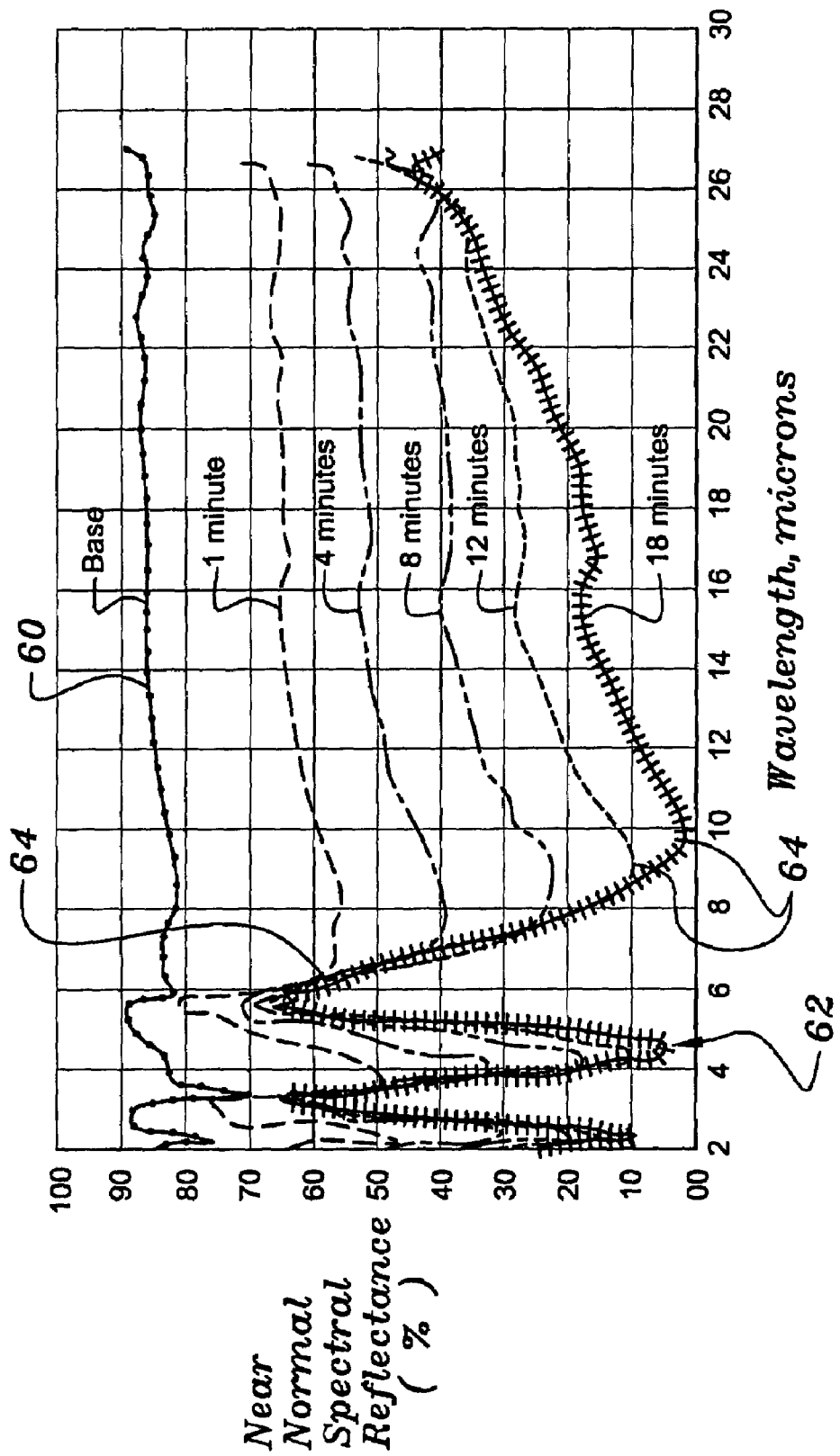
FIG. 3 depicts near normal spectral reflectance of a reflective ECD of the invention recorded at several times during ECD coloring.

Turning now to FIG. 3, one finds reflectance spectra in the 1.3 to 27 micron region measured from an ECD of the invention at various times during the process of coloring. The uppermost curve 60 of this set is the spectral reflectance of an open circuit or self-bleached ECD and is consistent with the transparent metal layer electrode having a transmittance of near 90% across the entire measured spectral interval. A positive voltage is applied to the IS electrode at a zero on the time scale to begin coloring the ECD by moving ions from the IS to the EC layer. As this EC loading progresses with time—where various times ranging from zero to eighteen minutes are depicted in FIG. 3—over most of the measured spectral region, more and more of the incident radiation is absorbed in the EC layer rather than being reflected from the mirror-like substrate electrode. At some wavelengths, e.g., around 1.3 microns to 5 microns, this effect is substantially less pronounced than elsewhere. This electrochromic device thus provides a controllable absorption in a spectral region comprising some wavelengths lying between about 1 and 27 microns, although the extent of utility is not uniform across the entire region.

The family of curves in FIG. 3 show several minima in reflectance (i.e., absorption peaks). One of these minima 62 lies generally between 1.3 and 5 microns. This is advantageous because there is an atmospheric window between 3 and 5.4 microns through which some IR systems operate. Another minimum 64 lies generally between 6 and 10 microns. Two effects are notable in both of these absorption peaks: the magnitude of absorption increases with time during coloring, and the position of each peak shifts to longer wavelengths as the coloring time increases. This indicates that an ECD of the invention, configured either for reflective or transmissive use can provide a tunable infrared filtering function in which wavelengths of radiation to be absorbed by the filter are progressively scanned as a function of time after applying an external voltage.

Notably, the nature of the tunable filter is such that reflectance can be reduced to near zero if layer thicknesses are correspondingly increased. Moreover, the ECD-filter is tunable for specific wavelengths and specific reflectances. Spectral location and intensity of ion insertion-extraction related absorption peaks depend on EC and IS layer selection.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

The invention claimed is:

1. An electrochromic device for controlling emissivity from a body in a spectral region comprising wavelengths between about five and thirty microns, the device comprising a substrate abutting the body when the device is in use, the substrate having a plurality of vacuum-deposited thin films disposed thereon, the thin films comprising at least:
   a substrate electrode deposited directly on the substrate;
   a plurality of active layers comprising at least an electrochromic layer, an electrolyte layer and an ion storage portion, the plurality of active layers characterized by a transmittance in the spectral region that is controllable by application of a voltage across the plurality of active layers; and
   a substantially transparent silver layer distal from the substrate;
   wherein the ion storage portion comprises one of:
   a dual layer structure having a first layer comprising vanadium pentoxide and a second layer, distinct from the first layer, comprising brown praseodymium oxide; and
   a mixed metal oxide layer comprising vanadium and praseodymium and a diffusion barrier layer comprising one of a transparent conducting oxide and praseodymium oxide, wherein the diffusion barrier layer is selected to prohibit diffusion of the silver into the layer comprising vanadium pentoxide.

2. A thin film electrochromic device vacuum deposited on a substrate, the device comprising:
   a substrate electrode deposited on the substrate;
   an electrochromic layer, comprising a lithiated tungsten oxide, formed directly on the substrate electrode;
   an ion transfer layer comprising lithium and nitrogen, the ion transfer layer vacuum deposited directly on the electrochromic layer;
   an electrolyte layer comprising lithium fluoro-nitride, the electrolyte layer vacuum deposited directly on the ion transfer layer;
   an ion storage layer comprising an oxide of vanadium, the ion storage layer vacuum deposited directly on the electrolyte layer; and
   a thin transparent silver electrode layer separated from the ion storage layer by a diffusion barrier layer comprising a material selected to prevent diffusion of the silver into the ion storage layer.

3. The thin film electrochromic device of claim 2 wherein the diffusion barrier comprises a transparent conducting oxide.

4. The thin film electrochromic device of claim 2 wherein the ion storage layer further comprises an oxide of praseodymium and wherein the diffusion barrier comprises one of a transparent conducting oxide and praseodymium oxide.

5. The thin film electrochromic device of claim 2 wherein the ion storage layer further comprises an oxide of praseodymium and wherein the diffusion barrier layer comprises praseodymium oxide.

6. The thin film electrochromic device of claim 2 further comprising a layer of silicon disposed on the silver electrode.

7. A thin film electrochromic device operable as a tunable optical filter for selectively absorbing infrared radiation in a spectral region characterized by wavelengths between about three and six microns, the electrochromic device vacuum deposited on a substrate, the device comprising:
   a substrate electrode deposited on the substrate;
   an electrochromic layer comprising a metal oxide, the electrochromic layer disposed directly on the substrate electrode, the electrochromic layer characterized by a transmittance in the spectral region that is controllable by the application of an external voltage and that varies with time when the voltage is applied;
   an ion storage portion separated from the electrochromic layer by an electrolyte layer; and
   a thin transparent metal electrode layer disposed on the ion storage portion;
   wherein the ion storage portion comprises one of:
   a layer comprising vanadium, praseodymium and oxygen and a diffusion barrier layer comprising a transparent conducting oxide or praseodymium oxide; and
   a layer comprising vanadium pentoxide and praseodymium oxide and a diffusion barrier layer comprising praseodymium oxide.

* * * * *